(12) United States Patent
Belezko et al.

(10) Patent No.: US 11,586,824 B2
(45) Date of Patent: Feb. 21, 2023

(54) SYSTEM AND METHOD FOR LINK PREDICTION WITH SEMANTIC ANALYSIS

(71) Applicant: ROYAL BANK OF CANADA, Toronto (CA)

(72) Inventors: Kostya Belezko, Toronto (CA); Brechann McGoey, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 178 days.

(21) Appl. No.: 17/065,234

(22) Filed: Oct. 7, 2020

(65) Prior Publication Data

US 2021/0103702 A1 Apr. 8, 2021

Related U.S. Application Data

(60) Provisional application No. 62/911,672, filed on Oct. 7, 2019.

(51) Int. Cl.
| | |
|---|---|
| *G06F 17/00* | (2019.01) |
| *G06F 40/30* | (2020.01) |
| *G06K 9/62* | (2022.01) |
| *G06F 16/955* | (2019.01) |

(52) U.S. Cl.
CPC .......... *G06F 40/30* (2020.01); *G06F 16/9558* (2019.01); *G06K 9/6215* (2013.01)

(58) Field of Classification Search
CPC .... G06F 40/30; G06F 40/134; G06F 16/9558; G06K 9/6215
See application file for complete search history.

(56) References Cited

U.S. PATENT DOCUMENTS

| | | | |
|---|---|---|---|
| 8,255,786 B1* | 8/2012 | Gattani | G06F 16/955 715/208 |
| 9,436,760 B1* | 9/2016 | Tacchi | G06F 16/9024 |
| 9,558,265 B1* | 1/2017 | Tacchi | G06F 16/338 |

(Continued)

FOREIGN PATENT DOCUMENTS

CN 108153851 A * 6/2018 ........... G06F 16/345

OTHER PUBLICATIONS

Broder, Andrei Z., 1997, On the resemblance and containment of documents, Sequences.

(Continued)

*Primary Examiner* — Laurie A Ries
(74) *Attorney, Agent, or Firm* — Norton Rose Fulbright Canada LLP

(57) ABSTRACT

A system, non-transitory computer-readable medium, and method are provided. The system comprises at least one processor and memory storing instructions which when executed by the at least one processor configure the at least one processor to perform the method. The non-transitory computer-readable medium has instructions thereon, which when executed by a processor, perform the method. The method comprises determining a similarity score between a first webpage and a second webpage, determining a popularity score of a link between the first webpage and the second webpage, determining a difference between the similarity score and the popularity score, and determining that the link between the first webpage and the second webpage may be improved if the difference is greater than a threshold value.

19 Claims, 9 Drawing Sheets

(56) References Cited

U.S. PATENT DOCUMENTS

| | | | | |
|---|---|---|---|---|
| 9,836,183 | B1* | 12/2017 | Love | G06F 16/904 |
| 10,387,546 | B1* | 8/2019 | Duran | G06F 16/951 |
| 10,810,357 | B1* | 10/2020 | Tsypliaev | G06F 3/0484 |
| 10,909,196 | B1* | 2/2021 | Suzuki | G06F 16/9535 |
| 11,244,020 | B2* | 2/2022 | Lu | G06F 40/53 |
| 2005/0256833 | A1* | 11/2005 | Zeng | G06F 16/951 |
| 2009/0282027 | A1* | 11/2009 | Subotin | H04L 61/4511 |
| | | | | 707/999.005 |
| 2017/0329844 | A1* | 11/2017 | Tacchi | G06F 16/9024 |
| 2018/0157633 | A1* | 6/2018 | He | G06F 16/2282 |
| 2018/0268253 | A1* | 9/2018 | Hoffman | G06V 30/414 |
| 2021/0133487 | A1* | 5/2021 | Bastide | G06F 40/284 |

OTHER PUBLICATIONS

Zhu, Eric, 2019, MinHash LSH Ensemble (https://ekzhu.github.io/datasketch/lshensemble.html).

Zhou, Tao et al., 2009, Predicting missing links via local information, Eur. Phys. J. B 71, 623-630.

Tombros, Anastasios et al., 2005, Factors Affecting Web Page Similarity, Proceedings of ECIR.

Yek, Justin, 2017, How to scrape websites with Python and BeautifulSoup (medium.freecodecamp.org).

* cited by examiner

SYSTEM AND METHOD FOR LINK PREDICTION WITH SEMANTIC ANALYSIS

CROSS REFERENCE TO RELATED APPLICATIONS

This application is a non-provisional of, and claims all benefit, including priority, to U.S. Application No. 62/911,672, dated Oct. 7, 2019 entitled SYSTEM AND METHOD FOR LINK PREDICTION WITH SEMANTIC ANALYSIS and incorporated herein in its entirety by reference.

FIELD

The present disclosure generally relates to the field of graph analytics, and in particular to a system and method for link prediction semantic analysis.

INTRODUCTION

Link-prediction is a research field in the Graph Analytics domain which aims to detect relationships which are highly likely to exist based on the observed network structure, but are not present as edges in the network. In many applications, the graph vertices contain semantic information which might be evaluated using the latest natural language processing (NLP) algorithms to generate numerical data on which traditional graph theory can be applied.

SUMMARY

In accordance with an aspect, there is provided a system for predicting improvements to links between webpages. The system comprises at least one processor and memory storing instructions which when executed by the at least one processor configure the at least one processor to determine a similarity score between a first webpage and a second webpage, determine a popularity score of a link between the first webpage and the second webpage, determine a difference between the similarity score and the popularity score, and determine that the link between the first webpage and the second webpage may be improved if the difference is greater than a threshold value.

In accordance with another aspect, there is provided a method of predicting improvements to links between webpages. The method comprises determining a similarity score between a first webpage and a second webpage, determining a popularity score of a link between the first webpage and the second webpage, determining a difference between the similarity score and the popularity score, and determining that the link between the first webpage and the second webpage may be improved if the difference is greater than a threshold value.

In accordance with another aspect, there is provided a non-transitory computer-readable medium having instructions thereon, which when executed by a processor, configure the processor to perform a method of predicting improvements to links between webpages. The method comprises determining a similarity score between a first webpage and a second webpage, determining a popularity score of a link between the first webpage and the second webpage, determining a difference between the similarity score and the popularity score, and determining that the link between the first webpage and the second webpage may be improved if the difference is greater than a threshold value.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

It is understood that throughout the description and figures, like features are identified by like reference numerals.

DETAILED DESCRIPTION

Embodiments of methods, systems, and apparatus are described through reference to the drawings.

Link-prediction is a research field in the Graph Analytics domain which aims to detect relationships which are highly likely to exist based on the observed network structure, but are not present as edges in the network. In many applications, the graph vertices contain semantic information which might be evaluated using the latest natural language processing (NLP) algorithms to generate numerical data on which traditional graph theory can be applied. Data sets based on webpages may be big and noisy. To detect missing relationships amongst webpages, existing online pages are downloaded and processed semantically (e.g., document summarization, information extraction). The "semantic" structure may then be compared to the physical structure.

In some embodiments, a method may assess the semantic similarity of vertices and compare the strength of these relationships with the existing edges. This method can be used to evaluate the design of networks such as websites by assessing how well their architecture serves user objectives. The statistical popularity (e.g., based on empirical data of website usage statistics) may be compared against the semantic similarity of webpages. In some embodiments, this method may be applied to corporate websites where hierarchical structure is more influential than underlying text.

In some embodiments, a method provides recommendations on how links between webpages could better serve users, and can discover "dead" pages that are isolated. The results could also be used to build personal or dynamic menus of the most popular or relevant pages. Thus, the user experience may be simplified and streamlined so that the user has to navigate through fewer links (clicks) to achieve their goal.

In some embodiments, attributed graphs describe nodes via vectors of attributes and also relationships between different nodes via edges. By transferring the given problem into the graph domain, network algorithms and NLP methods may be applied. Semantic methods may be applied to evaluate nodes of graphs to reveal their potential (but not existing) relationships.

The terms "page", "webpage" and "document" may be used interchangeably herein.

Figure 1:
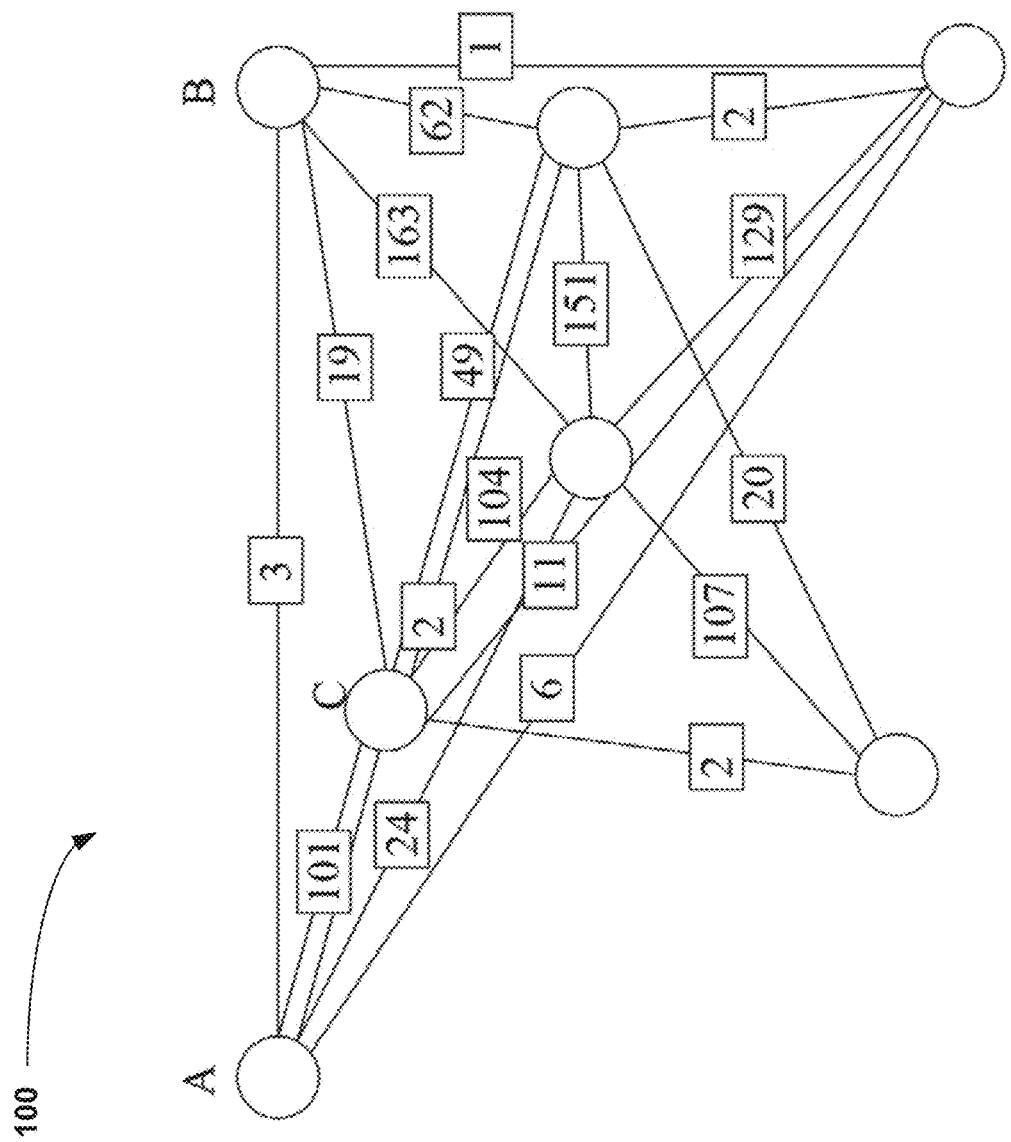
FIG. 1 illustrates, in a graph, an example of a representation of an online resource, in accordance with some embodiments.

FIG. 1 illustrates, in a graph, an example of a representation of an online resource 100, in accordance with some embodiments. A given data (corporate website or online resource) may be presented as a graph of interconnected webpages. The graph is directed with edges representing the existing hyperlinks. Different weights may be assigned on edges to reflect the volume of user-sessions that followed the underlying hyperlink based on collected statistical data over the website usage. For example, in FIG. 1, three (3) user-sessions over a given period of time (e.g., one month, one week, one day or any other period of time) were detected as having users click on a link on webpage A to get to webpage B. During that same time period, 101 user sessions were detected as having users click on a link on webpage A to get to webpage C. It should be understood that FIG. 1 illustrates an example and that other values may be observed/detected in other scenarios. Furthermore, the example is described referring to nodes as webpages and edges as hyperlinks between the webpages. It should be understood that in other examples, the nodes may represent items or sections on a page and the edges may represent links between those items or sections.

In some embodiments, a webpage A is identified which semantically refers to the scope of another page B but has no hyperlink to it. For example, a webpage describes different money transfer options but has no hyperlink to the page which actually performs the transfer.

In FIG. 1, graph 100 shows where nodes A and B denote webpages that have a weak popularity (e.g., user-sessions weight of 3), and that are associated with different communities (e.g., different languages, user groups, etc.). I.e., to go from page A to page B, a majority of users first go from page A to page C (e.g., user-session weight of 101), and then from page C to page B (e.g., user-sessions weight of 19). However, the semantic examination may reveal a very close relationship between A and B. Therefore, the web design of A could be revisited to emphasise the important relativity of a link from A to B. In some embodiments, the direct link from current/origin A to target B may not exist (e.g., users directly typed the URL for B while on A) or the direct link to B may be unintentionally invisible or difficult to locate on A for many users.

It may also be desirable to identify the reason for searches conducted by users. Sometimes, users are expected to navigate through a website and intuitively find all the required links. A user performing a search instead of using links may indicate that users cannot intuitively or conveniently locate the links. By scoring the semantic similarity of the search against the existing pages and links, insights may be gained to improve the website navigation and structural layout. For example, observing searches performed by users over a given period of time may reveal that many users wish to go from one webpage to another, but seem to use the search feature rather than links. It may be that the relevant links are not available, or difficult to locate, on certain webpages.

Figure 2:
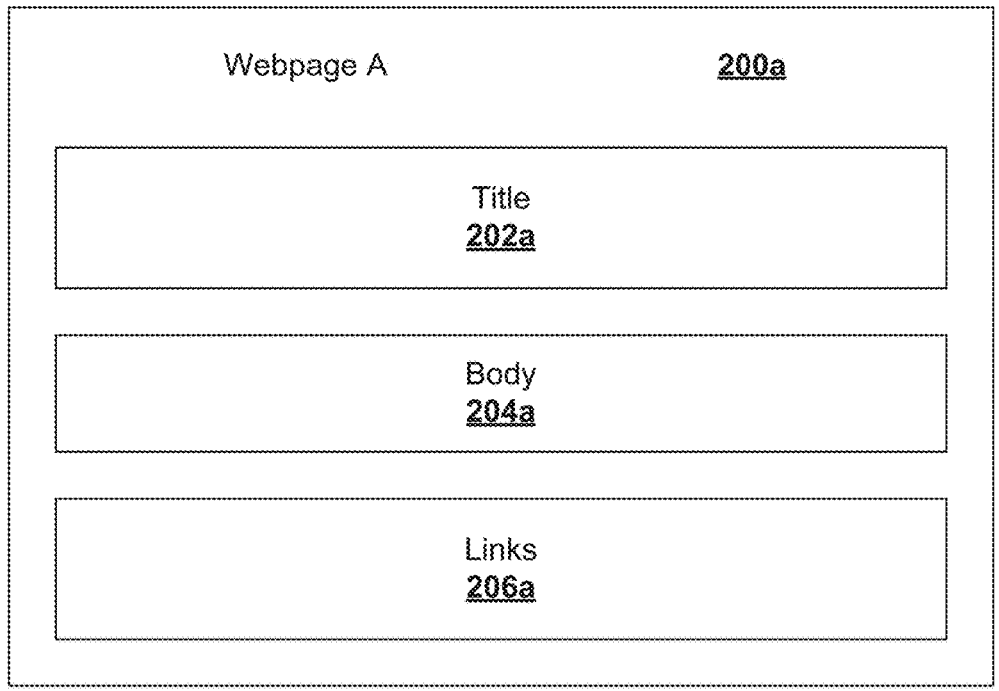
FIG. 2 illustrates an example of representations of two webpages, in accordance with some embodiments.
Figure 2:
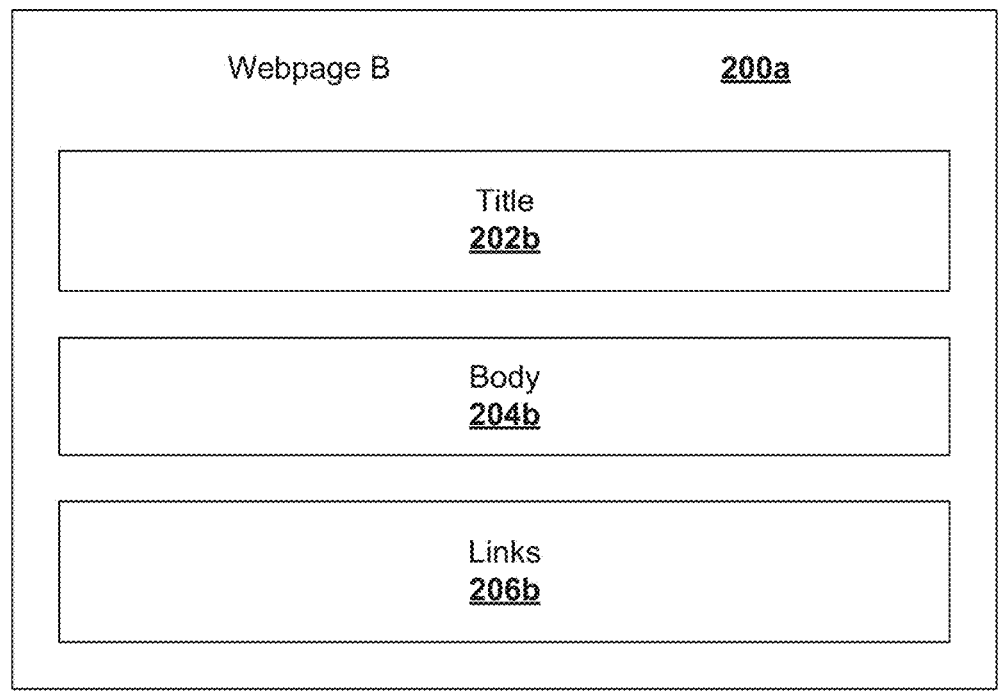

FIG. 2 illustrates an example of representations of two webpages 200a, 200b, in accordance with some embodiments. In some embodiments, webpages may have one or more sections that may be delineated by a virtual frame or by a hyperlink to another area of the page. In this example, webpage A 200a comprises a title 202a, a body 204a, and links 206a, and webpage B 200b comprises a title 202b, a body 204b, and links 206b. The body 204a, 204b may comprise text, images, or other objects. The links 206a, 206b may comprise references associated with text, images or objects in the body 204a, 204b of the webpage 200a, 200b, or at a standard location or virtual frame for typical links to other webpages (and/or in some embodiments sections) in a website.

Figure 3A:
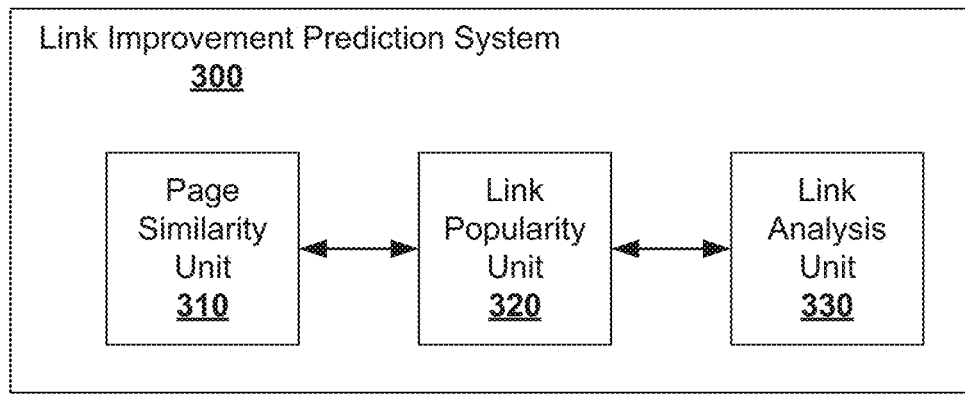
FIG. 3A illustrates, in a component diagram, an example of a link improvement prediction system, in accordance with some embodiments.

FIG. 3A illustrates, in a component diagram, an example of a link improvement prediction system 300, in accordance with some embodiments. As noted above, it should be understood that while the term "link" is described herein with reference to hyperlinks between webpages, the term "link" may also apply to any reference or connection between items on the same webpage or on different webpages. The system 300 may predict improvements to links between webpages. For example, the improvements may comprise the feasibility of adding a new link connecting webpages, an improvement to a visibility of an existing link, an improvement to an accessibility of an existing link, etc. The system 300 comprises a page similarity unit 310 for determining a similarity score between a first webpage A and a second webpage B. In some embodiments, the similarity score reflects how similar webpage B is to webpage A. It should be noted that the similarity score may be different in the other direction (e.g., the similarity score of webpage B starting from webpage A may be different than the similarity score of webpage A starting from webpage B). I.e., the similarity score may be used to determine a similarity of a target webpage from the perspective of an origin webpage. The system 300 also comprises a link popularity unit 320 for determining a popularity score of a link between the first webpage A and the second webpage B. It should be understood that the page similarity scores and the link popularity scores may be applied to sections or items on the same webpage or different webpages. In some embodiments, the popularity score may comprise an empirical weight of user-sessions of visits from page A to page B. The system 300 also comprises a link analysis unit 330 for determining a ratio or difference between the similarity score and the popularity score, and determining that the link (or connection) between the first webpage A (origin webpage) and second webpage B (target webpage) may be improved if the difference is greater than a threshold value. Other components may be added to the system 300. For example, a threshold value may be set to a minimum number of visits/hits during a time period, or to a ratio value between the similarity score and the popularity score.

Figure 3B:
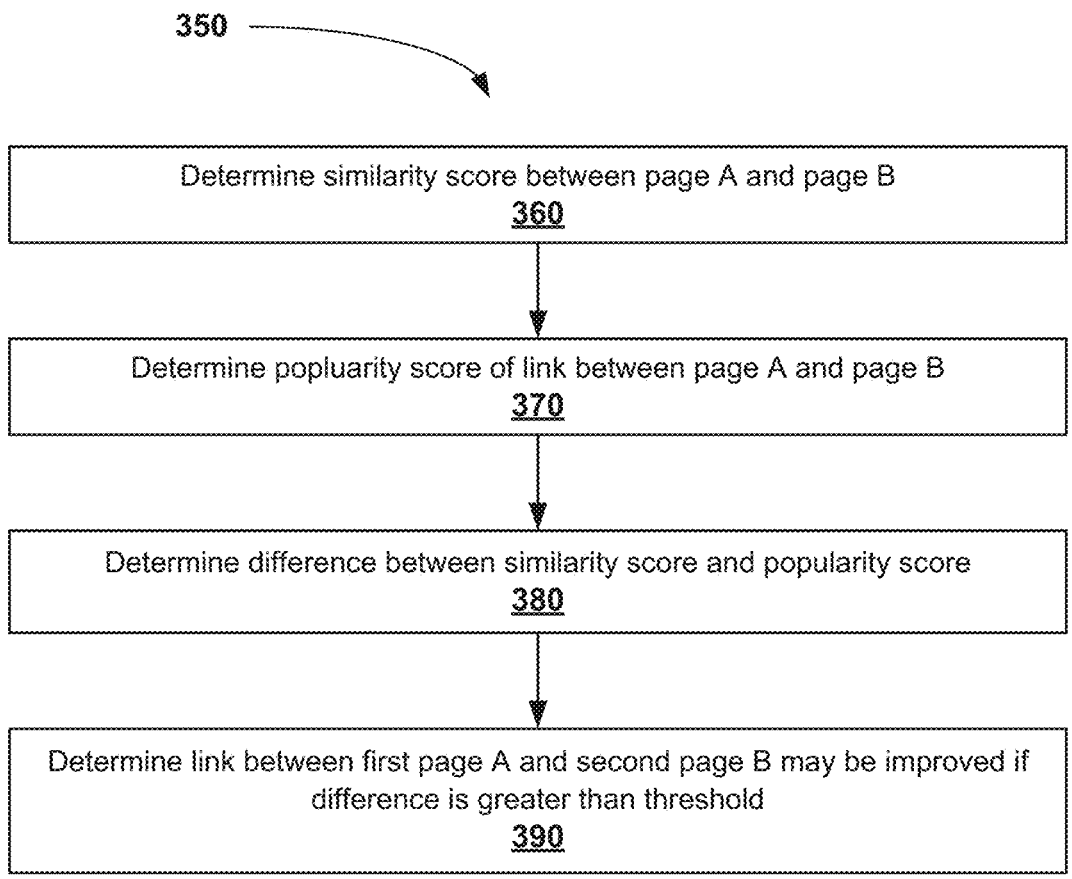
FIG. 3B illustrates, in a flowchart, an example of a method of predicting an improvement to a link between items such as pages or sections of pages, in accordance with some embodiments.

FIG. 3B illustrates, in a flowchart, an example of a method 350 of predicting an improvement to a link between items such as pages or sections of pages, in accordance with some embodiments. The method 350 may be performed by the link improvement prediction system 300. The method 350 may predict improvements to links between webpages. For example, the improvements may comprise the feasibility of adding a new link between webpages, an improvement to a visibility of an existing link, an improvement to an accessibility of an existing link, etc. The method 350 comprises determining 360 a similarity score between a first webpage A and a second webpage B (i.e., how similar target webpage B is as compared to origin webpage A), determining 370 a popularity score of a link from the first webpage A to the second webpage B, determining 380 a ratio or difference between the similarity score and the popularity score, and determining 390 the link from the first webpage A to second webpage B may be improved if the ratio or difference is greater than a threshold value. Other steps may be added to the method 350.

A model may estimate vertex similarities based on their internal structure and semantic content. The measure of similarity 310 may be scored by cosine similarity, Jaccard coefficient or by any other method. In some embodiments, a hybrid method may be used. Next, the score of similarity between two vertices may be viewed as a latent weight, and compared to the empirical weight of user-sessions (e.g., popularity 320). Overall, a correlation between the similarity and popularity of pages is expected. A relatively high difference 380, 390 between these two may reveal anomalies which are a subject for consideration and improvements:

$$-\omega(u,v)-\rho(u,v)| \qquad (1)$$

where u and v are two pages, w is a normalized edge's weight, and p stands for a normalized similarity score. The normalization rescales weights of edges from a single page u within all its neighbours {v}. In some embodiments, the normalization comprises converting a number of visits between a single page u and a single page v to a percentage of visits from a single page u and all its neighbours {v}. An anomaly may also reveal a deficiency in structure of the network. For example, the anomaly may pertain to the structure of a website.

A similarity score function for webpages 310 may be provided via a method to estimate the quantity of semantic references of two pages. However, well-known document cosine similarity cannot be simply applied because:
1. Page A might be a homepage containing many links to other pages and including a summary of page B. Laterally, A is very vague, but a strong reference to B is desired if there is a semantic context of B resembled within A.
2. The symmetric property may not hold: if A is "similar" to B, the opposite does not always hold. Therefore, a cosine similarity or Jaccard may not be used directly. The relationship should stay directional: A resembles B, but B may not resemble A to the same extent.

Another approach to express that type of relationship is containment. The goal is to find a measure of how much page A references the content of another page B. In contrast to Jaccard similarity, the metric of containment of B within A may be applied as a number of semantic elements of B present in A, relatively to all elements of B.

$$REF(A, B) = \frac{|A \cap B|}{|B|} \qquad (2)$$

The score may be represented as a number in the range [0, 1].

Figure 4:
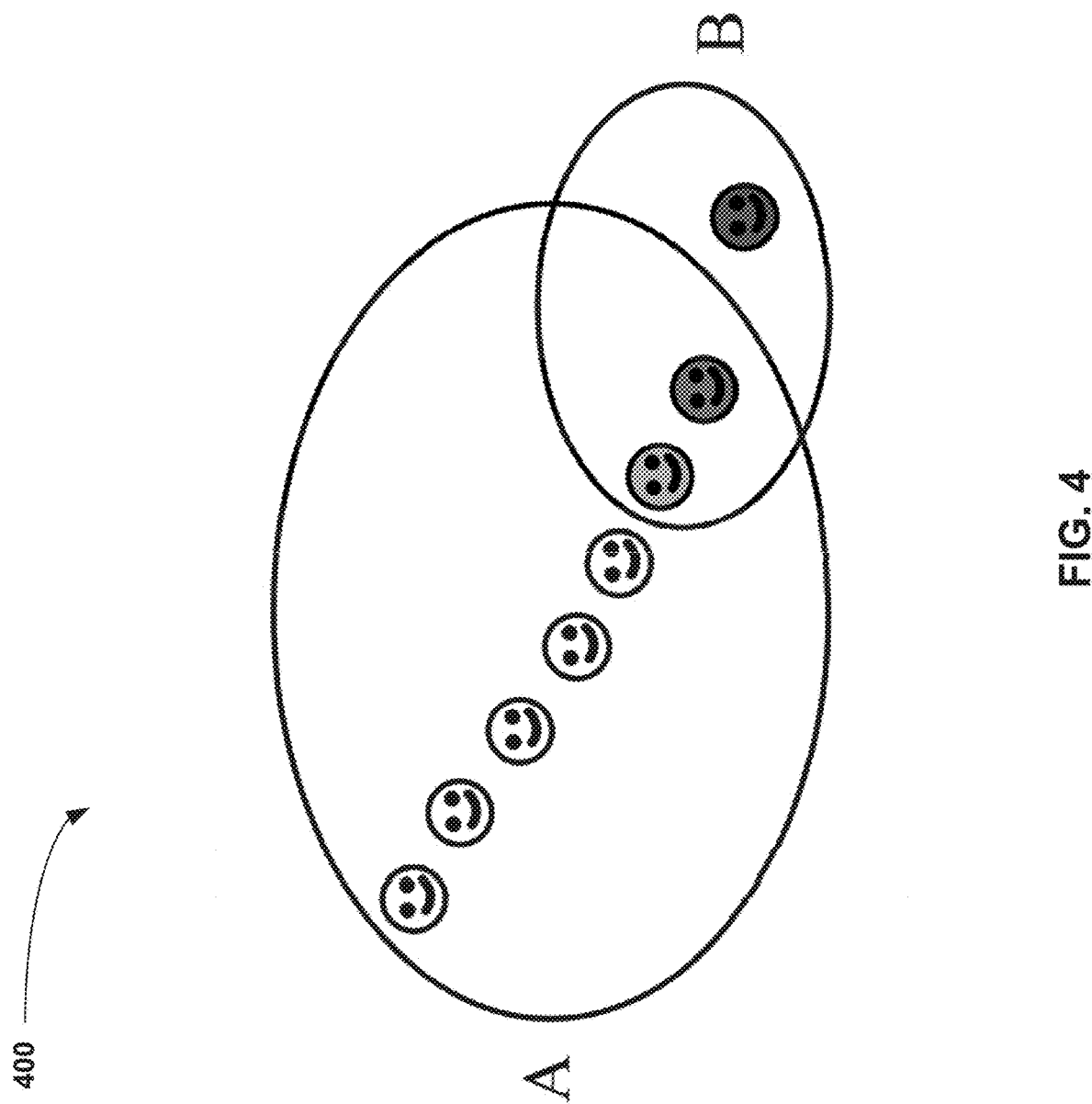
FIG. 4 illustrates, in a graph, an example of a website distribution, in accordance with some embodiments.

FIG. 4 illustrates, in a graph, an example of a website distribution 400, in accordance with some embodiments. An example count of REF(A,B)=⅔=0.66 may be interpreted as A is strongly referring to B. An example count of REF(B, A)=2/7=0.28 may be interpreted as B has twice weaker reference to A. It should be noted that the REF function does not constitute a measure of distance and transitivity, nor does it satisfy the property of symmetry:

$$REF(x,y) \neq REF(x,z) + REF(z,y)$$

$$REF(x,y) \neq REF(y,x)$$

For the sake of simplicity, the terms "containment", "relativeness", "reference" and "citation" may be used interchangeably. Different measures also exist, such as Common Neighbours, Salton Index, Leicht-Holme-Newman Index, Adamic-Adar Index, etc.

In some embodiments, additional NLP algorithms may be exploited to improve the accuracy of the determined similarity score 360 by applying additional methods in an ensemble manner. A Co-Reference Resolution may be used to locate all expressions that refer to the same entity in a text. This involves natural language understanding, such as document summarization and information extraction. A Textual Entailment (TE) may be used to compare a pair of sentences (taken from two webpages) and predict whether the facts in the first necessarily imply the facts in the second one. TE is a component of information extraction systems and is often used for filtering. An Abstractive Single Document Summarization may be used to generate short summaries of documents (webpages) using extractive methods. These summaries might be used in further similarity estimation.

There are a number of ways available to extract meaningful text from a webpage and convert it into a structure of attributes. In some embodiments, all parts of webpage are not treated equally. For example, the anchor text (the text that appears highlighted in a hypertext link) serves as a reference to another page rather than contributing to the bag of words (BoW) of the page itself. Generically, a weight per hypertext markup language (HTML) tag may be assigned to how much the HTML tag may or may not contribute to the overall linguistic score of the page itself.

Figure 5:
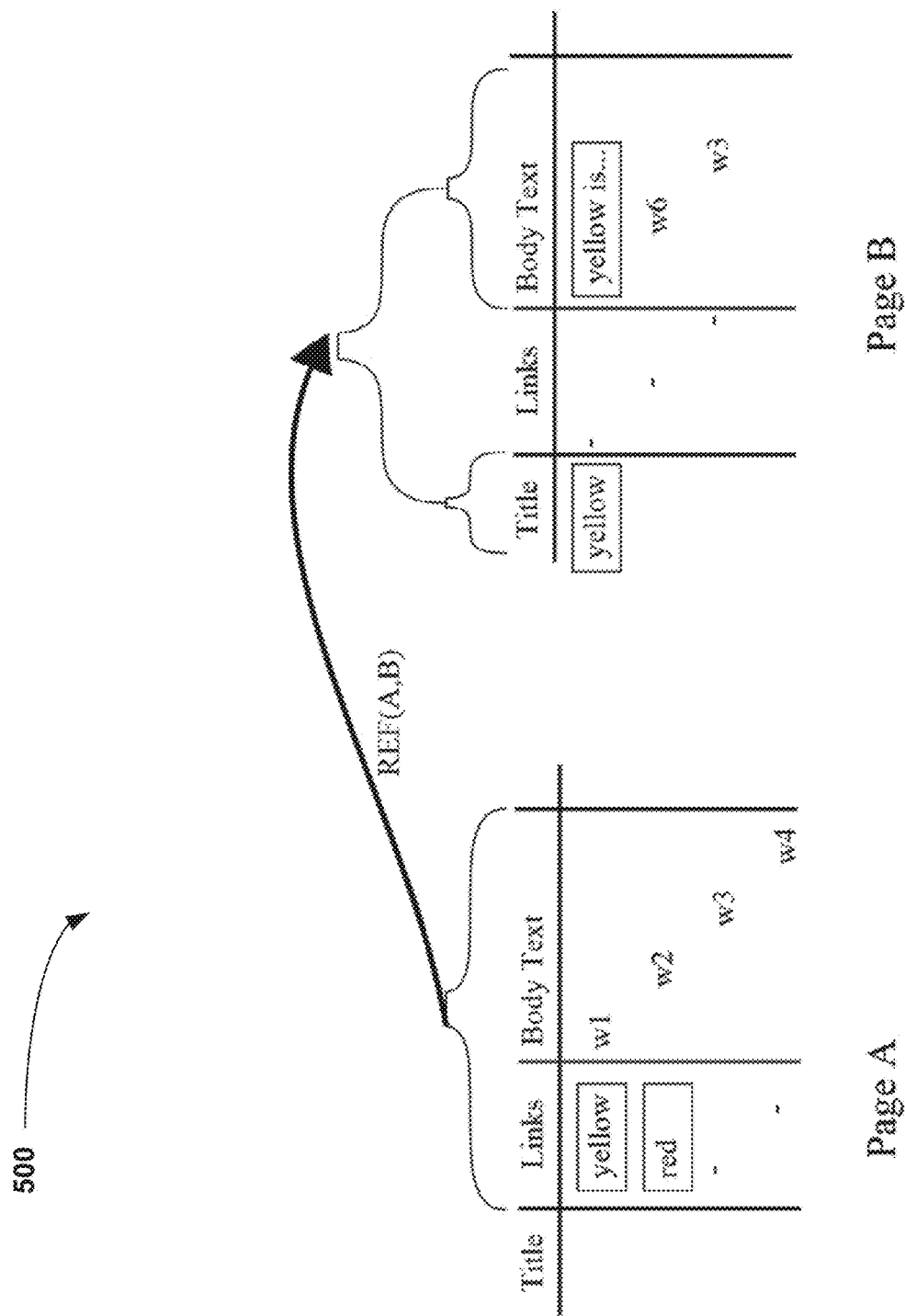
FIG. 5 illustrates another example of a webpage representation, in accordance with some embodiments.

FIG. 5 illustrates another example of a webpage representation 500, in accordance with some embodiments. In the scope of the present disclosure proposal, a webpage's HTML may be processed and the following sets of words constructed with respect to their HTML tags. In some embodiments, three (3) sets of words may be constructed as follows:

Title(A)—a set containing BoW extracted from HTML tags like <title>.

Links(A)—a set containing BoW extracted from the anchor text (<href>, submit forms).

Body(A)—a set containing BoW extracted from the rest of the tags or plain text.

To determine REF(A,B), Links(B) may be excluded as they refer to another pages, and construct two sets as following:

$$S_A = \text{Links}(A) \cup \text{Body}(A)$$

$$S_B = \text{Title}(B) \cup \text{Body}(B) \quad (3)$$

such that $S_A$ and $S_B$ are the actual sets used by REF. For example, equation (2) above may be updated to:

$$REF(A, B) = \frac{|S_A \cap S_B|}{|S_B|}. \quad (4)$$

For the sake of simplicity, A and B may continue to be used as a notation for processed sets $S_A$ and $S_B$ representing a BoW of their underline webpages.

Figure 6:
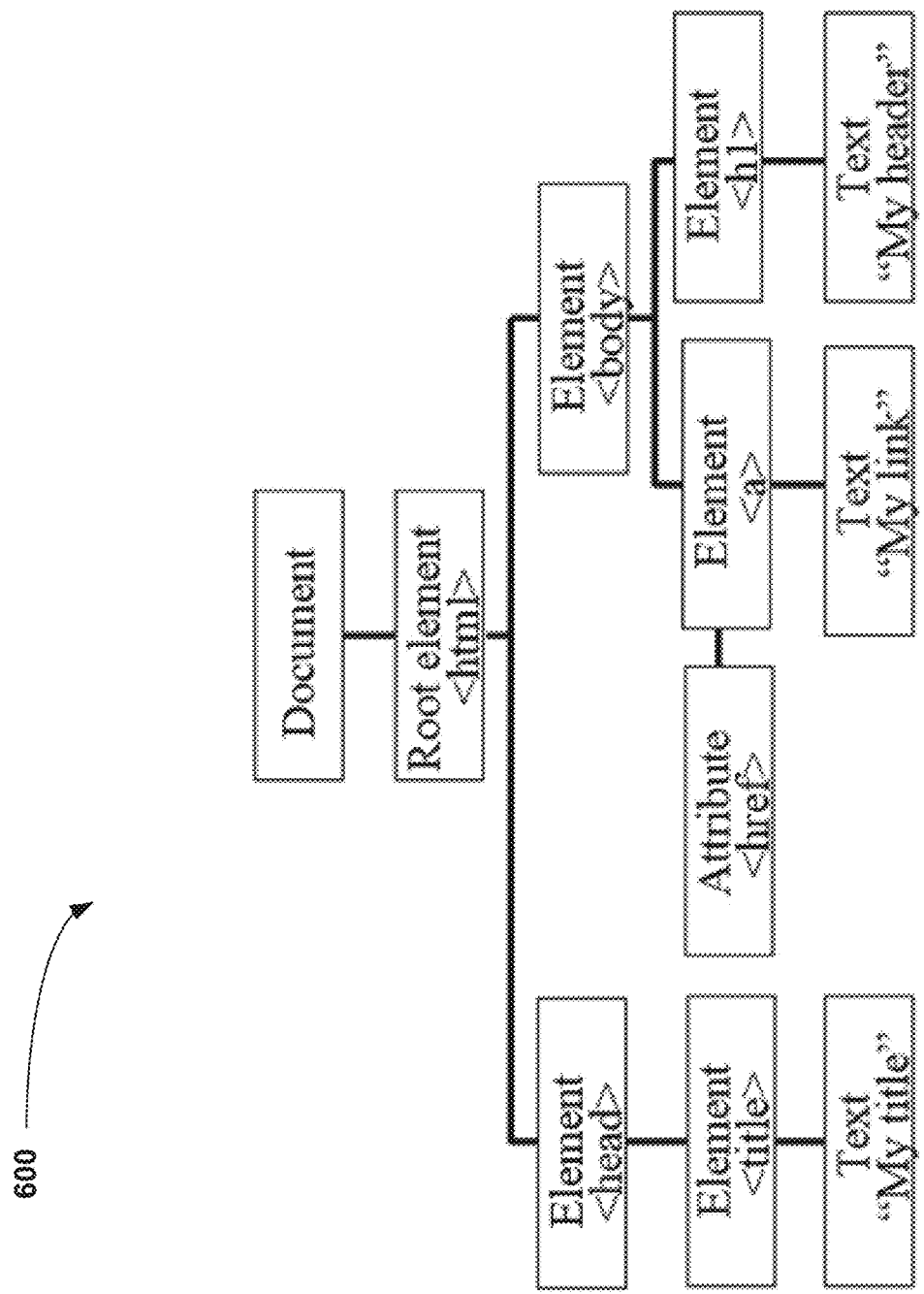
FIG. 6 illustrates, in a tree graph, another example of a webpage representation, in accordance with some embodiments.

FIG. 6 illustrates, in a tree graph, another example of a webpage representation 600, in accordance with some embodiments. A typical webpage comprises hierarchal and nested entities such as HTML frames, paragraphs, etc. Overall, a webpage may be presented as a tree of textual elements (e.g., using a document object model (DOM) representation of a source of the HTML document).

In some embodiments, these elements are evaluated individually to identify whether there exists a paragraph within page A that explicitly refers to the entire page B. Since page A may be semantically noisy and refer to a number of pages at the same semantic extent (e.g., A is a homepage having multiple links to pages on a variety of topics), page A may be separated into the atomic elements that are evaluated individually.

The REF(A,B) function may be applied upon each element of page A with the intent to locate a similarity of the entirety of that particular element within the whole target page B. The REF scores may be zeroed using a hyperparameter threshold ε:

$$REF(A,B) = \Sigma_{\forall i, REF(S_{A_i}, S_B) \geq \varepsilon} REF(S_{A_i}, S_B) \quad (5)$$

where $S_{A_i}$ is a BoW of element i within a breakdown of page A. In some embodiments, the breakdown is based on the webpage structure.

For example, by having ε=0.2 and scores [0.1, 0.15, 0.19], a weak reference is observed which results by having the overall score of zero. The idea is to cut off all the near-to-zero noise. That approach appears to be more accurate as the specific semantic reference toward another page is found. However, both methods depend on a vocabulary corpus of the website and language diversity across webpages.

Tokenization

Since the model is applied to a particular website, rather than over the entire unlimited domain, there is narrow context and lexicon. In some embodiments, the overall BoW comprising {1,2}-grams is built based on term frequency-inverse document frequency (TF-IDF), and the top 5-10% of highly frequent n-grams, stop-words and numbers are removed. For example, the word "the" may be present several times in all pages which would not be helpful in determining semantic similarity. Thus, removing such words would remove false positive similarity score components.

There are different approaches to tokenize text, for example Shingling. In some embodiments, an approach having an optimal solution may be selected from the results of different approaches used over a specific website's textual corpus. Each approach bears domain-specific assumptions on data.

Next, sets A and B are converted into binary vectors.

$$\frac{|A \cap B|}{|B|}$$

may be determined.

Performance

Once the score REF between two pages is determined 360, the function may be applied over the entire graph of a website. In some embodiments, the size of the website may be assumed to be N<=10K pages, and the lexical corpus to contain <=10K n-grams. REF may be applied pair-wise, i.e., $O(N^2)$ times. As an optimization, the LSH-based may improve the overall performance by narrowing down the number of candidates whose sets have a high Jaccard similarity.

Building Score Distribution

At the end, a complete digraph GREF is obtained where each pair of vertices u and v is represented by a weighted edge bearing their reference score REF(u,v). Now, a comparison of how much GREF correlates with the actual user-session graph of popularity may be performed.

As mentioned above, the actual structure of the website is denoted by a weighted directed graph G(V,E) where weights $W_{uv}$ represent the number of users browsed from webpage u to v. Therefore, the overall weight associated with all outgoing edges of vertex u is:

$$W_u = \rho_{\forall v} W_{uv}$$

Out-degree edges may be normalized to obtain the user-sessions weight distribution of u:

$$w(u) = \frac{W_{uv}}{W_u}$$

Figure 7:
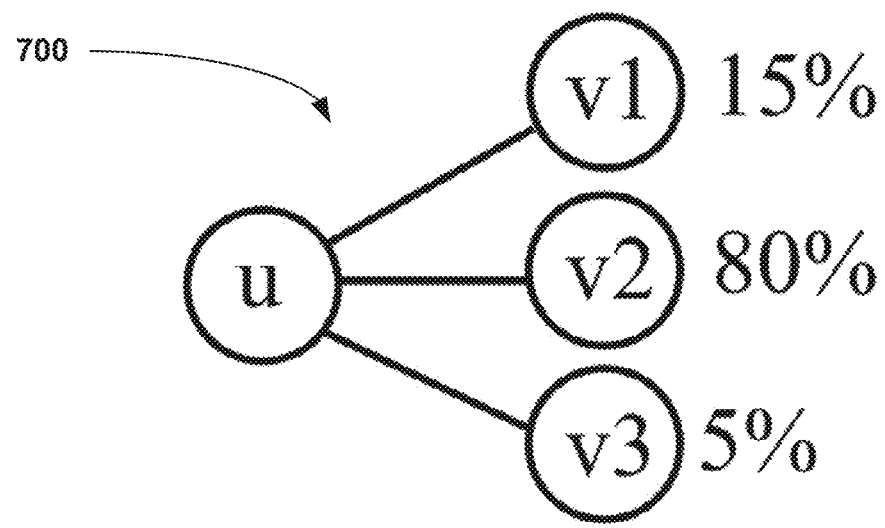
FIG. 7 illustrates an example of a user flow distribution, in accordance with some embodiments.

$W_{uv}=0$ may be assumed if there is no link present between u and v. FIG. 7 illustrates an example of a user flow distribution 700, in accordance with some embodiments. The flow distribution 700 is across all [out-]neighbors of u.

The distribution of similarity score REF of all neighbors of u within $G_{REF}$ may also be constructed.

A sensitivity hyperparameter may be denoted as α∈[0,1], which serves as a threshold allowing for the cut off (and ignoring of) edges having REF score less than α. The remaining edges are normalized. REF(u) may be denoted to be the resulting distribution of REF(u,$v_i$) scores of all semantic neighbors $v_i$ of u.

Figure 8:
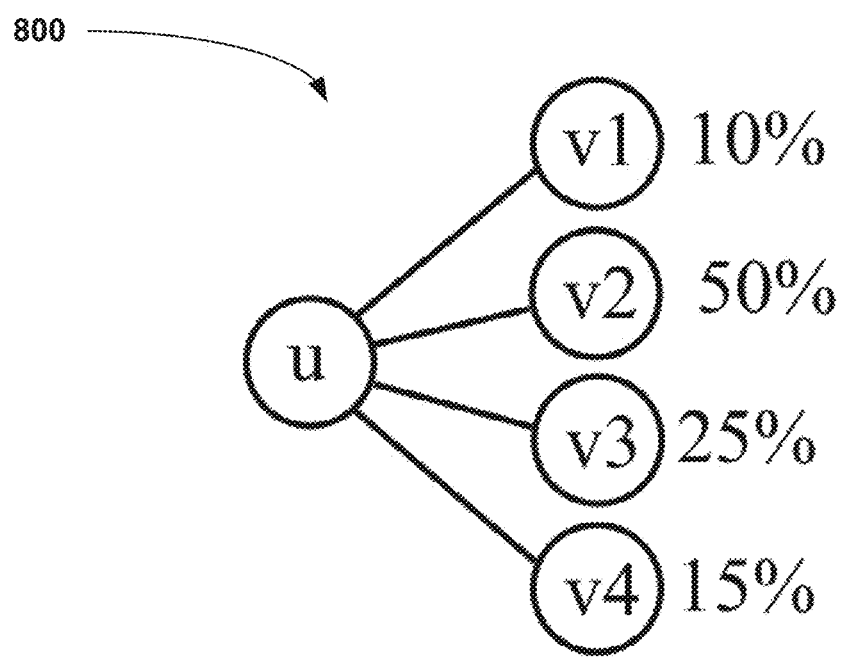
FIG. 8 illustrates another example of a user flow distribution, in accordance with some embodiments.

FIG. 8 illustrates another example of a user flow distribution 800, in accordance with some embodiments. The meaningful superset area of these two distributions REF(u) and ω(u) may be determined as:

$$\forall u \exists v_i : (u, v_i) \in E \text{ or } REF(u, v_i) > \alpha$$

Identifying Missing Links

If α=10%, the following correlation between the above distributions may be considered:

If REF(u,v)>α and $W_{uv}$=0, there is a missing link (case $v_4$).

For the remaining cases, the following statements may be claimed with a confidence sensitivity α that:
  a. If REF(u,v)>α and $W_{uv}$<α, then the existing link is not explicitly visible or not popular, but does reflect the target page correctly (case of $v_3$)
  b. If REF(u,v)>α and $W_{uv}$>α, then the existing link is popular and does reflect the target page correctly (case of $v_2$)

c. If REF(u,v)≤α and $W_{uv}$>α, then the existing link does not meaningfully reflect the target page and many users may mistakenly navigate through it (case $v_1$).

For missing links, a recommendation may be made to add the link. For links that are not as popular as they could be, a recommendation may be made to clarify and/or accentuate the link on the referencing page. In some embodiments, a recommendation may be made to delete links that are not popular and where the pages do not have similarity.

In some embodiments, a website may be tailored to include a frame or area that provides a set of (e.g., 3 or 4) optional links to a visitor. Such optional links may include links between "similar" pages that are "popular" based on the user's past history. Additionally and/or alternatively, such optional links may include links between "similar" pages that are "popular" based on past history of all visitors to the website.

Design Diagram

Figure 9:
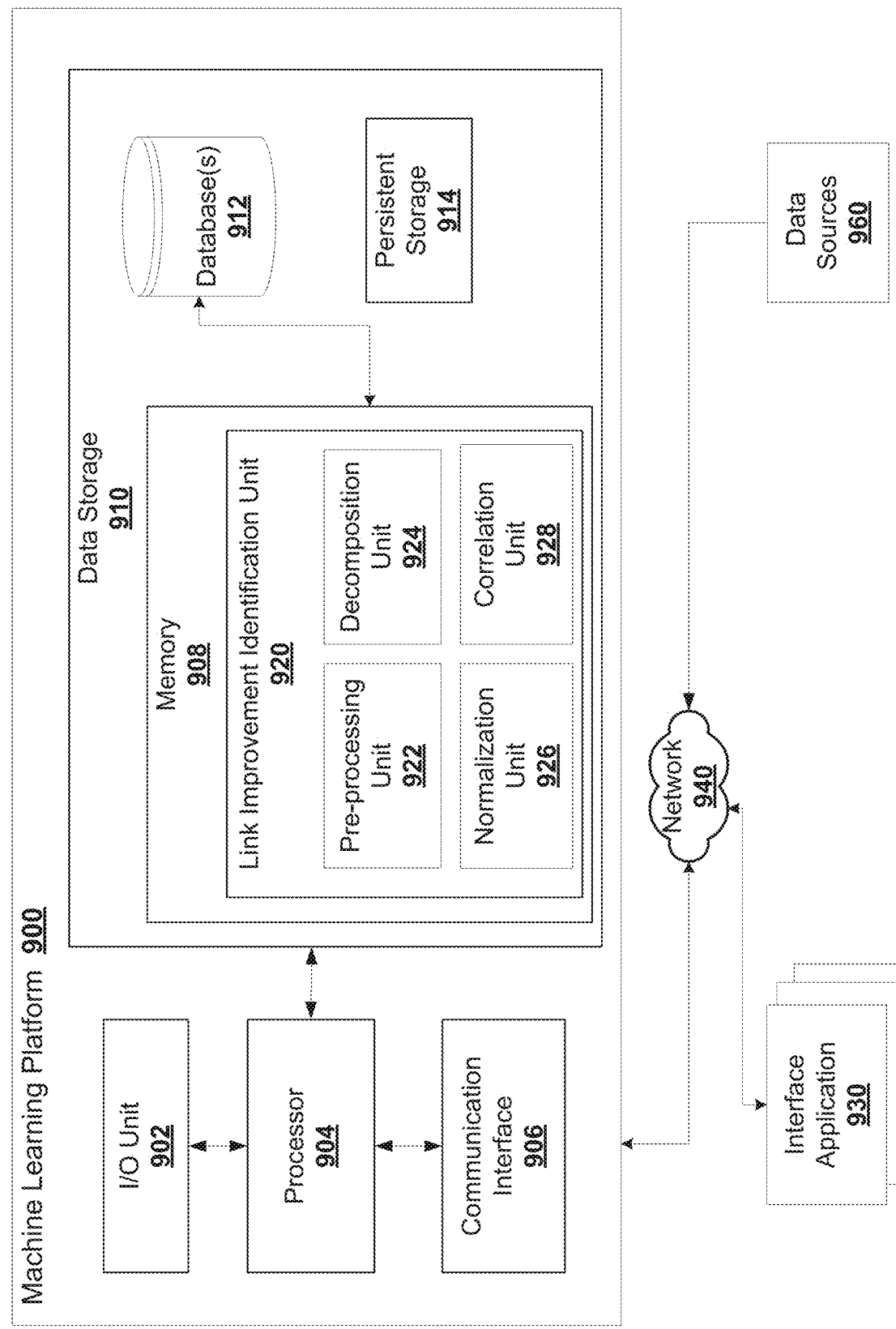
FIG. 9 illustrates, in a schematic diagram, an example of a link improvement prediction platform, in accordance with some embodiments.

The model may be applied to a website using machine learning. FIG. 9 illustrates, in a schematic diagram, an example of a physical environment for a machine learning platform 900, in accordance with some embodiments. The platform 900 may be an electronic device connected to interface application 930 and data sources 960 via network 940. The platform 900 can implement aspects of the processes described herein for link improvement prediction.

The platform 900 may include at least one processor 904 (herein referred to as "the processor 904") and a memory 908 storing machine executable instructions to configure the processor 904 to receive a neural network (from e.g., data sources 960). The processor 904 can receive a trained neural network and/or can train a neural network using training engine 924. The platform 900 can include an I/O Unit 902, communication interface 906, and data storage 910. The processor 904 can execute instructions in memory 908 to implement aspects of processes described herein.

The platform 900 may be implemented on an electronic device and can include an I/O unit 902, a processor 904, a communication interface 906, and a data storage 910. The platform 900 can connect with one or more interface devices 930 or data sources 960. This connection may be over a network 940 (or multiple networks). The platform 900 may receive and transmit data from one or more of these via I/O unit 902. When data is received, I/O unit 902 transmits the data to processor 904.

The I/O unit 902 can enable the platform 900 to interconnect with one or more input devices, such as a keyboard, mouse, camera, touch screen and a microphone, and/or with one or more output devices such as a display screen and a speaker.

The processor 904 can be, for example, any type of general-purpose microprocessor or microcontroller, a digital signal processing (DSP) processor, an integrated circuit, a field programmable gate array (FPGA), a reconfigurable processor, or any combination thereof.

The data storage 910 can include memory 908, database(s) 912 and persistent storage 914. Memory 908 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 910 can include memory 908, databases 912 (e.g., graph database), and persistent storage 914.

The communication interface 906 can enable the platform 900 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these.

The platform 900 can be operable to register and authenticate users (using a login, unique identifier, and password for example) prior to providing access to applications, a local network, network resources, other networks and network security devices. The platform 900 can connect to different machines or entities.

The data storage 910 may be configured to store information associated with or created by the platform 900. Storage 910 and/or persistent storage 914 may be provided using various types of storage technologies, such as solid state drives, hard disk drives, flash memory, and may be stored in various formats, such as relational databases, non-relational databases, flat files, spreadsheets, extended markup files, etc.

The memory 908 may include a link improvement identification unit 920. The link improvement identification module 920 may receive and/or obtain webpage content and visit log data a website (via processor 904 and/or database(s) 912) and transform said data into data sets. The link improvement identification unit 920 may also identify one or more links between pages that may be improved based on the difference between similarity and popularity scores for the pages and their link. The link improvement identification unit 920 may include a pre-processing unit 922, a decomposition unit 924, a normalization unit 926 and a correlation unit 928. The units 922, 924, 926, 928 will be further described below.

In a pre-processing stage (e.g., via pre-processing unit 922), web log data may be pulled to construct a user-session graph where each vertex is associated with a webpage and the weighed edges show the statistical volume of user sessions traversing through the edge. Next, the weights are normalized. Together, this would form the "popularity" graph.

In a decomposition step (e.g., via decomposition unit 924), a semantic vocabulary corpus of the website is constructed. For each webpage, html tags may be scraped and text extracted. The overall text may go through a standard process of stemming, word2vec and tf-idf. The top frequent tokens, numbers or any web personalization information may be filtered out. The result forms the overall BoW. At the end, each page is associated with three (3) vectorized sets of n-grams: title, links and body.

In a normalization step (e.g., via normalization unit 926), REF scores between all-pairs or across any subset (community domain or blocking) set of nodes are determined. Optimization and scoring a subset of the potentially similar pages may be performed by applying MinHash LSH Ensemble. Then, REF values are normalized to construct a REF score distribution per node.

In a correlation step (e.g., via correlation unit 928), REF score distributions are compared with respective popularity graphs to identify any missing links. For example, a 10% threshold may be used initially and adjusted as needed. The threshold relates to a sensitivity between the similarity and popularity measures (e.g., there is a 10% difference between the similarity and popularity measures). If the similarity measure equals the popularity measure (or is within a threshold sensitivity), then the design of the webpage link may be considered to be good.

While there exists research in this subfield, overall, these works target specific problems while the present disclosure combines multiple, cross-field approaches resulting in a new method of analysis. The present disclosure improves the search mechanism by matching not based just on words (content) but also on structure, removing unnecessary noise from the search. For example, comparing issue tracking tickets can be difficult because they have many fields, and care should be taken not to base results solely on pure text search, as structure is relevant.

In some embodiments, the link improvement prediction system 300 and/or platform 900 may provide for an automatic addition, deletion or modification to one or more links in a virtually framed link section of a webpage. In some embodiments, links to a second webpage may be added to a first webpage based on when an analysis of search queries results shows that users tend to search for a second webpage from a first webpage, and where there is no current link between the first webpage and second webpage despite a relatively high similarity score. In some embodiments, the usefulness of a recommended (and/or added, deleted or modified) link may be studied using the link improvement prediction system 300 and/or platform 900 to provide a feedback loop regarding the recommended link, and to provide refined recommendations regarding links between webpages of the website.

Figure 10:
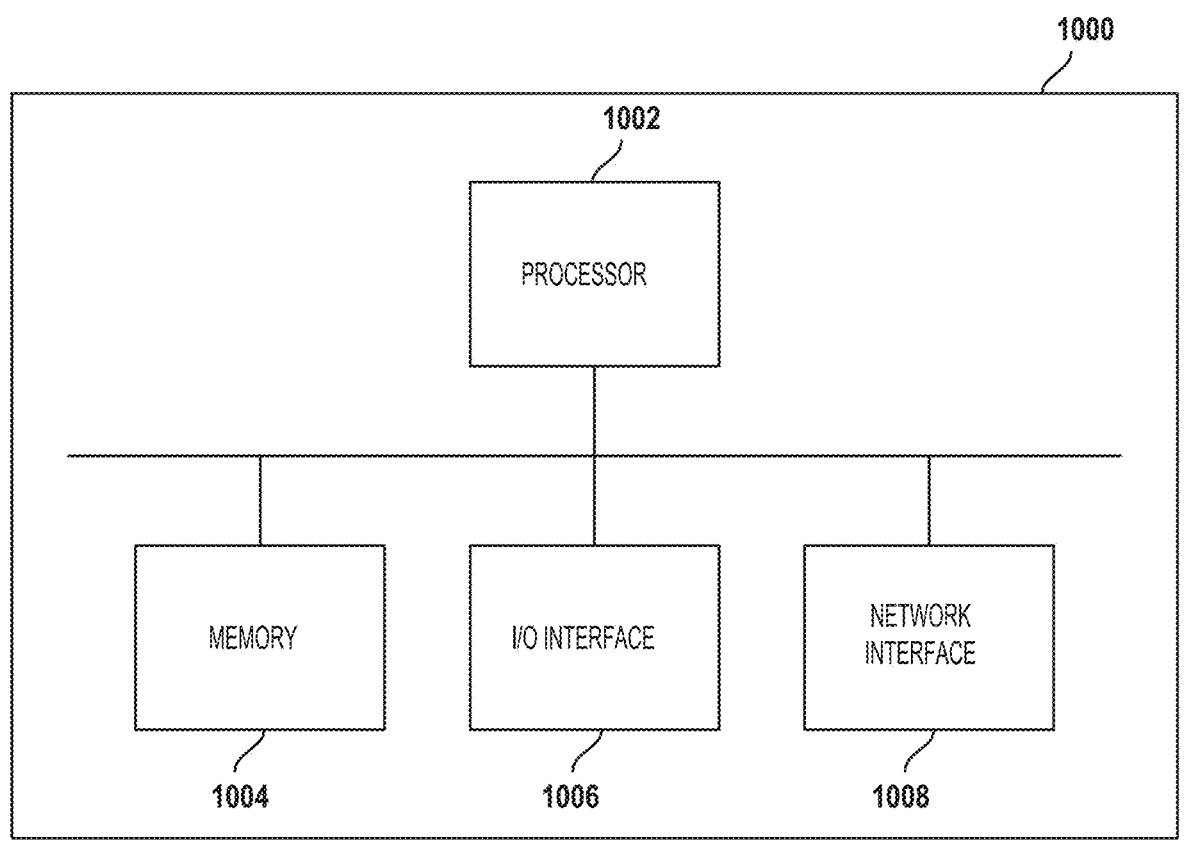
FIG. 10 illustrates, in a schematic diagram, an example of a computing device such as a server.

FIG. 10 is a schematic diagram of a computing device 1000 such as a server. As depicted, the computing device includes at least one processor 1002, memory 1004, at least one I/O interface 1006, and at least one network interface 1008.

Processor 1002 may be an Intel or AMD x86 or x64, PowerPC, ARM processor, or the like. Memory 1004 may include a suitable combination of computer memory that is located either internally or externally such as, for example, random-access memory (RAM), read-only memory (ROM), compact disc read-only memory (CDROM).

Each I/O interface 1006 enables computing device 1000 to interconnect with one or more input devices, such as a keyboard, mouse, camera, touch screen and a microphone, or with one or more output devices such as a display screen and a speaker.

Each network interface 1008 enables computing device 1000 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others.

The foregoing discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for predicting improvements to links between webpages, the system comprising:
   at least one processor; and
   a memory storing instructions which when executed by the at least one processor configure the at least one processor to:
   determine a similarity score between a first webpage and a second webpage, wherein:
   the similarity score is based on a metric of containment regarding how much the first webpage references the content of the second webpage,
   the metric of containment is defined as a number of semantic elements of the second webpage present in the first webpage, and
   the semantic elements correspond to a structure of the first webpage and the second webpage;
   determine a popularity score of a link between the first webpage and the second webpage;
   determine a difference between the similarity score and the popularity score; and
   determine that the link between the first webpage and the second webpage may be improved if the difference is greater than a threshold value.

2. The system as claimed in claim 1, wherein the improvement of the link between the first webpage and the second webpage comprises at least one of:
   an addition of a new link from the first webpage to the second webpage;
   an increase in visibility of an existing like from the first webpage to the second webpage; or
   an increase in accessibility of an existing like from the first webpage to the second webpage.

3. The system as claimed in claim 1, wherein the similarity score is based on internal structure and semantic content of the first webpage and the second webpage.

4. The system as claimed in claim 1, wherein the similarity score is based on at least one of:
   a cosine similarity; and
   a Jaccard coefficient.

5. The system as claimed in claim 1, wherein the metric of containment is defined as:

$$REF(A, B) = \frac{|A \cap B|}{|B|},$$

wherein A represents the first webpage and B represents the second webpage.

6. The system as claimed in claim 1, wherein to determine the similarity score the processor is configured to locate all expressions that refer to the same entity in a text.

7. The system as claimed in claim 1, wherein the popularity score comprises an empirical weight of user-session visits from the first webpage to the second webpage.

8. The system as claimed in claim 1, wherein the difference between the similarity score and popularity score is defined by:

$$|\omega(u,v)-\rho(u,v)|$$

where u and v are two pages, ω is a normalized edge's weight, and ρ stands for a normalized similarity score.

9. The system as claimed in claim 1, wherein the threshold comprises a sensitivity threshold.

10. A computer-implemented method of predicting improvements to links between webpages, the method comprising:
    determining, by a processor, a similarity score between a first webpage and a second webpage, wherein:
    the similarity score is based on a metric of containment regarding how much the first webpage references the content of the second webpage,
    the metric of containment is defined as a number of semantic elements of the second webpage present in the first webpage, and
    the semantic elements correspond to a structure of the first webpage and the second webpage;
    determining, by the processor, a popularity score of a link between the first webpage and the second webpage;
    determining, by the processor, a difference between the similarity score and the popularity score; and
    determining, by the processor, that the link between the first webpage and the second webpage may be improved if the difference is greater than a threshold value.

11. The method as claimed in claim 10, wherein the improvement of the link between the first webpage and the second webpage comprises at least one of:
    an addition of a new link from the first webpage to the second webpage;
    an increase in visibility of an existing like from the first webpage to the second webpage; or
    an increase in accessibility of an existing like from the first webpage to the second webpage.

12. The method as claimed in claim 10, wherein the similarity score is based on internal structure and semantic content of the first webpage and the second webpage.

13. The method as claimed in claim 10, wherein the similarity score is based on at least one of:
    a cosine similarity; or
    a Jaccard coefficient.

14. The method as claimed in claim 10, wherein the metric of containment is defined as:

$$REF(A, B) = \frac{|A \cap B|}{|B|},$$

wherein A represents the first webpage and B represents the second webpage.

15. The method as claimed in claim 10, wherein determining the similarity score comprises locating, by the processor, all expressions that refer to the same entity in a text.

16. The method as claimed in claim 10, wherein the popularity score comprises an empirical weight of user-session visits from the first webpage to the second webpage.

17. The method as claimed in claim 10, wherein the difference between the similarity score and popularity score is defined by:

$$|\omega(u,v)-\rho(u,v)|$$

where u and v are two pages, ω is a normalized edge's weight, and ρ stands for a normalized similarity score.

18. The method as claimed in claim 10, wherein the threshold comprises a sensitivity threshold.

19. A non-transitory computer-readable medium having instructions thereon which, when executed by a processor, perform a method comprising:

determining a similarity score between a first webpage and a second webpage, wherein:
   the similarity score is based on a metric of containment regarding how much the first webpage references the content of the second webpage,
   the metric of containment is defined as a number of semantic elements of the second webpage present in the first webpage, and
   the semantic elements correspond to a structure of the first webpage and the second webpage;
determining a popularity score of a link between the first webpage and the second webpage;
determining a difference between the similarity score and the popularity score; and
determining that the link between the first webpage and the second webpage may be improved if the difference is greater than a threshold value.

* * * * *